(12) United States Patent  (10) Patent No.: US 12,446,603 B2
Goldstein et al.  (45) Date of Patent: Oct. 21, 2025

(54) SOLUBLE RICE FLOUR COMPOSITIONS

(71) Applicant: Cargill, Incorporated, Wayzata, MN (US)

(72) Inventors: Avi Goldstein, Golden Valley, MN (US); Xian-Zhong Han, Maple Grove, MN (US); Thomas Kennedy Hutton, Minneapolis, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 0 days.

(21) Appl. No.: 17/757,845

(22) PCT Filed: Dec. 22, 2020

(86) PCT No.: PCT/US2020/066594
§ 371 (c)(1),
(2) Date: Jun. 22, 2022

(87) PCT Pub. No.: WO2021/133795
PCT Pub. Date: Jul. 1, 2021

(65) Prior Publication Data
US 2023/0075232 A1  Mar. 9, 2023

Related U.S. Application Data

(60) Provisional application No. 62/952,912, filed on Dec. 23, 2019.

(51) Int. Cl.
*A23L 7/10* (2016.01)
*A23C 11/10* (2021.01)
(Continued)

(52) U.S. Cl.
CPC .............. *A23L 7/198* (2016.08); *A23C 11/10* (2013.01); *A23L 2/52* (2013.01); *A23L 7/107* (2016.08); *A23L 33/40* (2016.08); *A23V 2002/00* (2013.01)

(58) Field of Classification Search
CPC ...... A23V 2250/5118; A23V 2200/126; A23L 7/198; A23L 7/10; A23L 2/39;
(Continued)

(56) References Cited

U.S. PATENT DOCUMENTS 2,721,802 A * 10/1955 Scalise .................... A21D 2/02
426/578
2,987,424 A  6/1961 Olnick
(Continued)

FOREIGN PATENT DOCUMENTS

AU  2006258034 A1  12/2006
CN  1287564 A  3/2001
(Continued)

OTHER PUBLICATIONS

Wikipedia, retrieved online Feb. 1, 2024, https://en.wikipedia.org/wiki/Dextrose_equivalent (Year: 2024).*
(Continued)

*Primary Examiner* — Hong T Yoo (57) ABSTRACT

Described herein are soluble rice flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

16 Claims, 5 Drawing Sheets

(51) Int. Cl.
    *A23L 2/52* (2006.01)
    *A23L 7/104* (2016.01)
    *A23L 33/00* (2016.01)

(58) Field of Classification Search
    CPC ......... A23L 33/40; A23L 2/52; A21D 13/047; A21D 2/186; A21D 8/042; A21D 2/18; A21D 6/00
    See application file for complete search history.

(56) References Cited

U.S. PATENT DOCUMENTS

| | | | |
|---|---|---|---|
| 3,849,194 | A | 11/1974 | Armbruster et al. |
| 3,897,305 | A | 7/1975 | Hurst |
| 4,027,043 | A | 5/1977 | Schroeder et al. |
| 4,282,319 | A | 8/1981 | Conrad |
| 4,597,974 | A | 7/1986 | Fonteneau et al. |
| 4,830,861 | A | 5/1989 | Puski et al. |
| 4,865,863 | A | 9/1989 | Prosise et al. |
| 4,923,709 | A | 5/1990 | Slimak |
| 4,990,344 | A | 2/1991 | Euber |
| 5,149,799 | A | 9/1992 | Rubens |
| 5,350,593 | A | 9/1994 | Lacourse et al. |
| 5,552,175 | A | 9/1996 | Camburn |
| 5,686,123 | A | 11/1997 | Lindahl et al. |
| 5,695,806 | A * | 12/1997 | Bateman ............... A23L 23/00 426/804 |
| 5,711,986 | A | 1/1998 | Chiu et al. |
| 5,789,012 | A | 8/1998 | Slimak |
| 5,846,786 | A | 12/1998 | Senkeleski et al. |
| 8,241,696 | B2 | 8/2012 | Chung et al. |
| 8,470,386 | B2 * | 6/2013 | Villagran ............... A21D 13/40 426/560 |
| 8,574,644 | B2 | 11/2013 | Chatel et al. |
| 8,586,113 | B2 | 11/2013 | Carder et al. |
| 8,591,970 | B2 | 11/2013 | Chatel et al. |
| 9,011,947 | B2 | 4/2015 | Carder et al. |
| 9,510,614 | B2 | 12/2016 | Carder et al. |
| 12,127,569 | B2 | 10/2024 | Goldstein et al. |
| 12,127,570 | B2 | 10/2024 | Goldstein et al. |
| 2004/0197379 | A1 | 10/2004 | Ryan et al. |
| 2005/0244563 | A1 | 11/2005 | Cavalieri et al. |
| 2006/0029708 | A1 * | 2/2006 | Fukumori ............. A21D 13/44 426/549 |
| 2006/0251792 | A1 * | 11/2006 | Shariff ................. A21D 6/003 426/622 |
| 2007/0059428 | A1 | 3/2007 | Chigurupati |
| 2007/0116844 | A1 | 5/2007 | Park et al. |
| 2008/0260909 | A1 | 10/2008 | Chung et al. |
| 2008/0305212 | A1 | 12/2008 | Wong et al. |
| 2010/0316765 | A1 | 12/2010 | French et al. |
| 2011/0189341 | A1 | 8/2011 | Chatel et al. |
| 2012/0003356 | A1 | 1/2012 | Ekanayake et al. |
| 2012/0003375 | A1 | 1/2012 | Ekanayake et al. |
| 2012/0009299 | A1 | 1/2012 | Xie |
| 2012/0070559 | A1 | 3/2012 | Foss |
| 2012/0244253 | A1 | 9/2012 | Roger et al. |
| 2013/0183405 | A1 | 7/2013 | Carder |
| 2014/0193563 | A1 | 7/2014 | Carder et al. |
| 2014/0193564 | A1 | 7/2014 | Carder |
| 2014/0343273 | A1 | 11/2014 | Fonteyn et al. |
| 2015/0173401 | A1 | 6/2015 | Neaud |
| 2015/0181921 | A1 | 7/2015 | Perrine et al. |
| 2016/0081375 | A1 | 3/2016 | Chatel et al. |
| 2016/0100591 | A1 | 4/2016 | Cully et al. |
| 2017/0273337 | A1 | 9/2017 | Brijwani et al. |
| 2018/0268997 | A1 | 9/2018 | Koga et al. |
| 2021/0112833 | A1 | 4/2021 | Goldstein et al. |
| 2021/0133799 | A1 | 5/2021 | Adibi |
| 2021/0133805 | A1 | 5/2021 | Adibi |
| 2022/0000155 | A1 | 1/2022 | Goldstein et al. |

FOREIGN PATENT DOCUMENTS

| | | |
|---|---|---|
| CN | 1352530 A | 6/2002 |
| CN | 1912144 A | 2/2007 |
| CN | 101053378 A | 10/2007 |
| CN | 101193557 A | 6/2008 |
| CN | 101396102 A | 4/2009 |
| CN | 102176840 A | 9/2011 |
| CN | 102286570 A | 12/2011 |
| CN | 102334647 A | 2/2012 |
| CN | 102686973 A | 9/2012 |
| CN | 103039904 A | 4/2013 |
| CN | 103068260 A | 4/2013 |
| CN | 104621510 A | 5/2015 |
| CN | 105142423 A | 12/2015 |
| CN | 105177088 A | 12/2015 |
| CN | 105341802 A | 2/2016 |
| CN | 105431047 A | 3/2016 |
| CN | 107814880 A | 3/2018 |
| CN | 109527398 A | 3/2019 |
| CN | 109957035 A | 7/2019 |
| CN | 110301580 A | 10/2019 |
| CN | 112313340 A | 2/2021 |
| CN | 112969372 A | 6/2021 |
| EP | 0026485 A2 | 4/1981 |
| EP | 0898901 A2 | 3/1999 |
| EP | 2648526 A1 | 10/2013 |
| EP | 2648545 B1 | 9/2015 |
| EP | 2648540 B1 | 10/2018 |
| JP | 1737962 C | 2/1993 |
| JP | 2001-321108 A | 11/2001 |
| KR | 101689483 B1 | 12/2016 |
| RU | 2057458 C1 | 4/1996 |
| WO | 94/28741 A1 | 12/1994 |
| WO | 03/32748 A1 | 4/2003 |
| WO | 2004/007739 A1 | 1/2004 |
| WO | 2006133388 W | 12/2006 |
| WO | 2007/028900 A1 | 3/2007 |
| WO | 2007/090610 A2 | 8/2007 |
| WO | 2008115046 W | 9/2008 |
| WO | 2014/150022 A1 | 9/2014 |
| WO | 2014/160351 A1 | 10/2014 |
| WO | 2017/173324 A2 | 10/2017 |
| WO | 2020006030 W | 1/2020 |
| WO | 2020/092730 A1 | 5/2020 |
| WO | 2021/133799 A1 | 7/2021 |
| WO | 2021/133805 A1 | 7/2021 |

OTHER PUBLICATIONS

A. Rosniyana, Characteristics of local rice flour (MR 220) produced by wet and dry milling methods, J. Trop Agric. And Fd. Sc. 44(1)(2016) 147-155.

Goyat, J. et al., Nutritional, functional and sensory properties of ready-to-eat chia and quinoa mix enriched low amylose rice based porridge mixes, Current Research in Nutrition and Food Science, vol. 7, No. 2, Jan. 1, 2019, pp. 399-414.

Xia Mi Mommy, Health Review, vol. 7, How many coarse grains are suitable for a baby, Sep. 30, 2017, p. 41.

10 types of rice noodles were carefully tested, Jan. 1, 2019, 1-6, Parents World, https://zhuanlan.zhihu.com.

Ba Khady et al: "Hydrolysis of starches and flours by sorghum malt amylases for dextrins production", European Food Research and Technology, Springer Berlin Heidelberg, Berlin/Heidelberg, vol. 236, No. 5, Mar. 20, 2013 (Mar. 20, 2013), pp. 905-918, XP035310990, =.

Benavides M Q et al: "Elaboracion de productos alimenticios a base de harina de arroz mediante hidrólisis enzimatica", Tecnologia, Instituto De Investigaciones Tecnologicas, Colombia, vol. 25, No. 151, Jan. 1984, pp. 9-36, XP009533471, ISSN: 0049-3201.

Chinese Journal of Tropical Crops, vol. 31, No. 02 2010-02-25 Tan Yong, Effects of Various Additives on Viscosity Properties of Cassava pp. 304-308.

Collazos Hernadnez Gilberto, WO2004/007739 A1, English Machine Translation, Abstract, Jan. 2004. (Year: 2004).

(56) References Cited

OTHER PUBLICATIONS

Farm Products Processing vol. 2013, No. 3 2013-03-15 Tong Longxing, Sauce meat p. 33.

Guangxi Chemical Industry, No. 02 Jul. 7, 1983 Fan Wenhua, Study on Cassava Starch and Modification thereof pp. 17-31.

Interquell Cereals GmbH: Hydrolised rice flour, data sheet published Sep. 9, 2012; with verification of text description published online at least by Oct. 2, 2013 at: https://web.archive.org/web/20131002053448/http://gb.lebensmittelpartner.de/production/jet-cooker/hydrolised-rice/ (Year: 2013).

Kaur et al. Comparative Study on Functional, Rheological, Thermal, and Morphological Properties of Native and Modified Cereal Flours. International Journal of Food Properties. May 26, 2016. <https://www.tandfonline.com/doi/epdf/10.1080/10942912.2015.1089892?needAccess=true> (Year: 2016).

Kusuma Yanti, H. et al., Swelling Power and Water Solubility of Cassava and Sweet Potatoes Flour, Procedia Environmental Sciences. Vol. 23 2015: abstract, p. 166, figure 2, paragraph 3.1.

Lages Ana C. A. et al: "Production of Glucose From Tapioca (Cassava Starch) and Farinha Demandioca (Cassava Meal)", Journal of Food Science, vol. 43, No. 3, May 1, 1978 (May 1, 1978), pp. 1012-1014, XP055889824, US ISSN: 0022-1147, DOI:.

Onodu, Bonaventure C., Richard J Culas and Ezekiel U Nwose, Facts about dietary fibre in cassava: Implicaion for diabetes' medical nutrition therapy, Intregative Food, Nutrition and Metabolism, vol. 5(3): 1-5, 2018. (Year: 2018).

Schlegel: Published On Aug. 16, 2007 as WO 2007/090610 A2 (Year: 2007).

Tapioca Flour. Nutritionix. Mar. 15, 2016. Retrieved from URL: https://www.nutritionix.com/i/nutritionix/tapioca-flour-1-cup/56e824e51f1686336a45c97f.

UL Solutions: Hydrolysed Rice Flour, Gluten-Free; Prospector®; UL LLC @2024. (Year: 2024).

Zhi-Qiang Yang; Yue Meng: "Optimization of jet liquefaction process of corn flour", Food Science and Technology, vol. 43, No. 3, Mar. 1, 2018 (Mar. 1, 2018), pp. 159-164, XP009533483,.

* cited by examiner

SOLUBLE RICE FLOUR COMPOSITIONS

CROSS REFERENCE TO RELATED APPLICATIONS

This application is a national phase application of PCT/US2020/066594, filed 22 Dec. 2020, entitled SOLUBLE RICE FLOUR COMPOSITIONS which claims the benefit of U.S. Provisional Patent Application No. 62/952,912, filed 23 Dec. 2019, entitled SOLUBLE RICE FLOUR COMPOSITION which are hereby incorporated by reference in their entirety.

TECHNICAL FIELD

This application relates to soluble flour compositions and methods of manufacturing the same.

BACKGROUND

Consumers are asking for label friendly alternatives to maltodextrin in food and beverage applications. While there is a desire to create label-friendly alternatives, there is also a desire for such alternatives to have similar functionality as that of maltodextrin.

SUMMARY

Described herein are soluble rice flour compositions having desirable chemical properties and solubility and viscosity functionality for use in food products such as, beverage mix, infant food, a medicinal product, an emulsion, convenience foods, or a snack-based filling. Such compositions can be used as a partial or complete replacement of maltodextrin and offer a more clean-label alternative.

According to the invention, the soluble rice flour composition includes a carbohydrate content ranging from 80 to 95 wt %. A protein content of the soluble rice flour ranges from 2-10 wt %. A fat content of the soluble rice flour composition is less than 3 wt %. Additionally, an insoluble fiber content of the soluble rice flour composition is less than 3 wt %.

Preferably, the soluble rice flour composition has a particle size distribution, wherein 90% of particles (D90) have a size of 100 microns or less and 50% of particles (D50) have a particle size of 25 microns or less.

Preferably, the soluble rice flour composition has a particle size distribution in which 100% of particles have a size of less than 1 micron.

According to various aspects, a use of a soluble rice flour composition includes use in a beverage mix, an infant food, a medicinal product, an emulsion, a convenience food, a snack-based filling, or a food product.

According to various aspects, a method of preparing a rice flour composition includes treating a rice flour with a first enzyme to form a treated rice flour. The method further includes treating the treated rice flour with a second enzyme that is different than the first enzyme to form the soluble rice flour composition.

BRIEF DESCRIPTION OF THE FIGURES

The drawings illustrate generally, by way of example, but not by way of limitation, various embodiments of the present invention.

DETAILED DESCRIPTION

Described herein are soluble rice flour compositions and a method of manufacturing the same. Such soluble rice flour compositions can be used in food and beverage applications as a maltodextrin replacement.

As used herein, the term "soluble rice flour" can be referred to as hydrolyzed, enzymatically treated, enzymatically-modified, and/or solubilized rice flour. Such soluble rice flour has been treated to promote greater solubility of their principle components in liquids such as water. Further, such soluble flour demonstrates similar functionality as that of maltodextrin, has a desirable "clean flavor", mouthfeel, and texture suitable for food and beverage applications. As used herein, the term "soluble" is referencing solubility of flour components in water. As used herein, the term "flour" includes (1) non-grain flours and (2) fractionated, non-whole grain flours wherein a portion of bran and germ have been removed.

Described herein is an improved soluble rice flour composition created by treating a soluble rice flour starting material (e.g. a flour that was previously treated with an alpha-amylase enzyme—such process described in International PCT Application PCT/US2019/039153, hereby incorporated by reference) with a second enzyme. As an example, PCT Application PCT/US2019/039153 describes a method of treating the soluble rice flour with an alpha-amylase enzyme and includes adding the alpha-amylase enzyme in an amount ranging from 0.02-2% alpha-amylase enzyme relative to weight of the flour, 0.02-0.1% alpha-amylase enzyme relative to weight of the flour, and in some aspects from 0.045-0.085% alpha-amylase enzyme relative to weight of the flour, to form a reaction mixture. The alpha-amylase enzyme and slurry make up the reaction mixture. The reaction mixture can be treated at a temperature ranging from 60° C. to 140° C., 85° C. to 140° C., or 90° C. to 100° C., such treatment promotes gelatinization and further solubilization. The reaction mixture is treated until a dextrose equivalent ("DE") of between 5 and 18 is achieved. As understood herein, dextrose equivalent is a measure of the amount of reducing sugars present in a sugar product, expressed as a percentage on a dry basis relative to dextrose. In some aspects, the cooking would take place until a DE of between 8 and 12 is achieved. In some examples, a jet cooker is used to facilitate the reaction. Once the reaction is complete and the desired DE is achieved, the alpha-amylase enzyme is inactivated utilizing common methods such as the addition of acid or heat, and a soluble flour is obtained. The soluble flour is cooled to a temperature ranging from 50° C. to 60° C. and the pH of the soluble flour is adjusted to a range from about 3 to about 6. The pH can be adjusted using base solutions such as sodium hydroxide. The soluble flour can undergo additional processing, for example spray drying and sifting.

Figure 1:
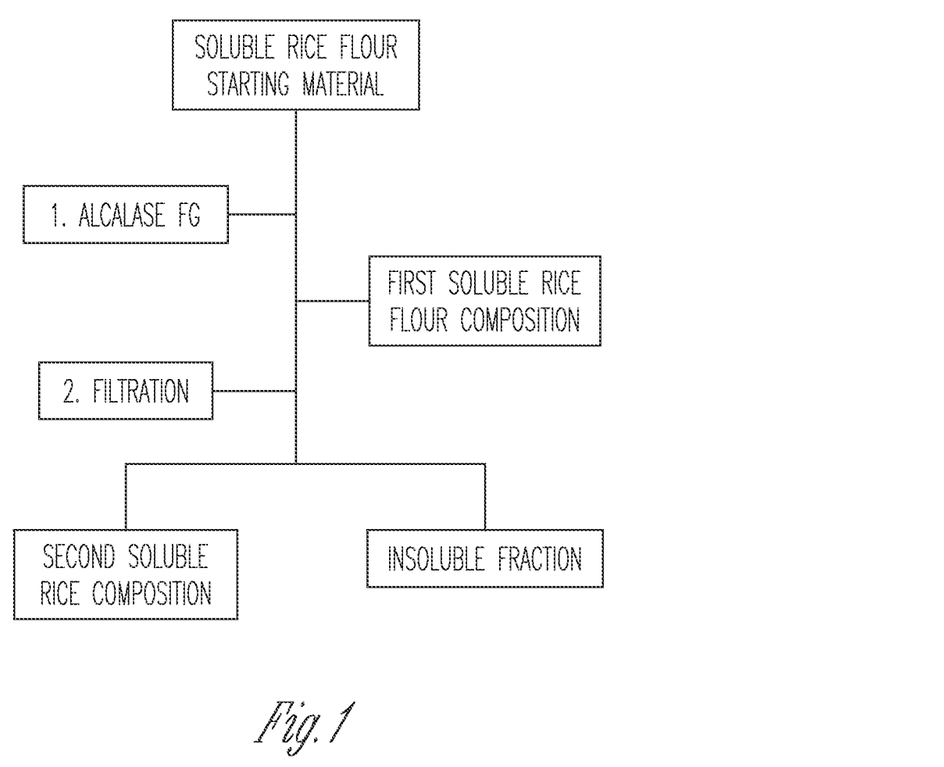
FIG. 1 provides an illustration of the manufacturing process to achieve the soluble rice flour compositions described herein.

Preferably, the second enzyme is a protease enzyme, however other bacterial and fungal enzymes may also be used. This protease-enzyme treated soluble rice flour composition is referred to herein as the "first soluble rice flour composition". The first soluble rice flour composition optionally can be subsequently filtered to create a filtered soluble rice flour composition referred to herein as the "second soluble rice flour composition". Collectively, both first and second soluble rice flour compositions are referred to herein as the "soluble rice flour compositions". FIG. 1 provides an illustration of the manufacturing process to achieve the soluble rice flour compositions described herein.

Compositionally, the soluble rice flour compositions described herein includes a carbohydrate content ranging from 80 to 95 wt %. Preferably, said carbohydrate content is less than or equal to 95 wt % and greater than or equal to 80 wt %. 81, 82, 83, 84, 85, 86, 87, 88, 89, 90, 91, 92, 93, or 94 wt %.

The protein content of the soluble rice flour compositions range from 2 to 10 wt %, preferably from 4 to 8 wt %. Preferably, said protein content is less than or equal to 10 wt % and greater than or equal to than 2 wt %, 3, 4, 5, 6, 7, 8 or 9 wt %.

The fat content is less than 3 wt %, preferably less than 2 wt %, more preferably less than 1 wt %, or less than 0.5 wt %.

The insoluble fiber content of the soluble rice flour compositions is less than 3 wt %, preferably less than 2 wt %, more preferably less than 1 wt %, or less than 0.5 wt %.

The dextrose equivalent ("DE") of the soluble rice flour compositions described herein are in a range of 5 to 18, preferably 8 to 15. Preferably, said DE is less than or equal to 8 wt % and greater than or equal to 5, 6, 7, 8, 9, 10, 11, 12, 13, 14, 15, 16 or 17. Compared to native rice flour compositions, the soluble rice flour compositions described herein have significantly improved solubility and viscosity functionality for certain food applications.

The soluble rice flour compositions described herein are substantially soluble and have improved solubility over the soluble rice flour starting material. Without being bound by any theory, it is believed that the second enzyme treatment with the protease enzyme is the cause of such solubility improvement and that subsequent filtration further improves solubility.

Solubility is measured by particle size distribution and based on the wet/dispersed solubility in 90° C. water. By soluble flour is herein understood a flour having a solubility in water at a temperature in a range of 5° C. to 95° C., 20° C. to 90° C., 20° C. to 25° C. and at a pH in a range of 4 to 7, or 7.

The soluble rice flour compositions preferably comprise a particle size distribution wherein 90% of particles have a size of 100 microns or less, more preferably 80 microns or less, more preferably 60 microns or less, even more preferably 50 microns or less, or 40 microns or less. Preferably, said particle size is at least 10 microns.

The soluble rice flour compositions preferably comprise a particle size distribution wherein 50% of particles have a particle size of 25 microns or less, more preferably 20 microns or less, more preferably 10 microns or less, or 5 microns or less. Preferably, said particle size is at least 1 micron.

Further, the soluble rice flour compositions preferably comprise a particle size distribution wherein 10% of particles have a size of 10 microns or less, more preferably 5 microns or less, or 3 microns or less. Preferably, said particle size is at least 1 micron.

In some aspects, the filtered, second soluble rice flour composition is nearly completely soluble in water in which 100% of particles have a size of less than 1 micron, less than 0.5 microns, or 0 microns.

Furthermore, the soluble rice flour compositions have desirable viscosity functionality. The soluble rice flour compositions have a viscosity ranging from 1 to 10 cP at 20° C. and 10% dry solids, from 2.5 to 3.5 cP at 20° C. and 10% dry solids, or less than or equal to 10 wt % and greater than or equal to 1 cP at 20° C. and 10% dry solids, 1.5, 2, 2.5, 3, 3.5, 4, 4.5, 5, 5.5, 6, 6.5, 7, 7.5, 8, 8.5, 9, 9.5, or 10 cP at 20° C. and 10% dry solids.

The soluble rice flour composition as described herein is desirable for use in food applications. Notable food applications include but are not limited to beverages, beverage mixes, infant food, medicinal products, food emulsions, convenience foods, bakery, dairy, and snack-based fillings or food products (including frozen meals). Beverages and beverage mixes can include instant mixes for hot or cold beverages, flavored milk including chocolate milk, carbonated soft drinks, fruit juices, sports beverages, nutrition beverages, and infant formula. Dairy can include ice cream, yogurt, sour cream, whip cream, and non-dairy vegan alternatives. Convenience foods include but are not limited to salad dressings (pourable and spoonable), sauces (instant and prepared), condiments, puddings, bars, cereals, coatings for cereal, spreads, low-fat spreads, icings, hard candies, soft candies, gummy products, and dry mix seasonings. Bakery can include cookies, cakes, muffins, crackers, pastries, and laminated baked products.

The soluble rice flour compositions as described herein can be used as at least a partial replacement of maltodextrin in food applications and in many cases can be used as a full replacement of maltodextrin in food applications. Such soluble flour can be an effective maltodextrin replacement in any food application in which maltodextrins are currently used. The soluble rice flour compositions demonstrate similar functionality (e.g., pH, solubility, and viscosity) and sensory as maltodextrin making it a suitable replacement for maltodextrin in food applications. Such replacement allows for consumer-friendly labelling as soluble flours may be more well received by some consumers as compared to maltodextrin.

Further, such soluble rice flour compositions additionally has the capability to replace maltodextrins in flavor encapsulation applications wherein a flavor emulsion is created and spray dried, to convert a liquid flavor into a solid. In these applications maltodextrins may be used alongside a lipophilic starch, or alternately used alone to create a flavor emulsion. Maltodextrins are typically used in this space due to their ability to form matrices that positively contribute to encapsulation. The soluble rice flour compositions described herein can replace maltodextrins in this space due to their bland flavor, low viscosity, and low cost. Additionally, soluble rice flour compositions can replace maltodextrin in plating oil-based flavors.

In some aspects, the soluble rice flour compositions as described herein can be used for instant sauces dry mix that is reconstituted to a sauce formed by the consumer), prepared sauces, dry mix seasoning, and flavor encapsulation. Such soluble rice flour compositions can be added in varying amounts and consistently demonstrate similar taste and functionality as maltodextrin.

In aspects of formulations where the soluble rice flour compositions replace maltodextrin, the soluble rice flour composition can replace any suitable wt % of maltodextrin. For example, the soluble rice flour composition can replace 1 wt % to 100 wt % of the total amount of maltodextrin present in a formulation, 5 wt % to 95 wt %, 10 wt % to 90 wt %, 15 wt % to 85 wt %, 20 wt % to 80 wt %, 25 wt % to 75 wt %, 30 wt % to 70 wt %, 35 wt % to 65 wt %, 40 wt % to 60 wt %, 45 wt % to 55 wt, or less than or equal to 100 wt % and greater than or equal to 5 wt %, 10, 15, 20, 25, 30, 35, 40, 45, 50, 55, 60, 65, 70, 75, 80, 85, 90, 95, or 100 wt %. Furthermore, in aspects of formulations a weight ratio between the soluble rice flour composition and maltodextrin (soluble rice flour composition: maltodextrin) can range from 100:0 to 5:95, 95:5 to 10:90, 90:10 to 15:85, 85:15 to 20:80, 80:20 to 25:75, 75:25 to 30:70, 70:30 to 35:65, 65:35 to 40:60, 60:40 to 45:55, or 55:45 to 50:50.

EXAMPLES

Example #1: Method of Making Soluble Rice Flour Compositions

A batch size of 12 kg 25% (w/w) soluble rice flour starting material (rice flour hydrolyzed by alpha-amylase) having a protein content of 7.1%, and an addition of 0.28% (8.82 g) Novozyme's Alcalase FG (protease enzyme) based on rice flour, as is, was obtained. A water slurry of starting material (4.78% moisture) slurry preparation was prepared. The slurry was maintained at ambient temperature and a speed of mixing was adjusted, as needed, to prevent settling of flour solids. Subsequently, steam heating was carried out to heat the slurry to a desired temperature (60° C., Groen Kettle setting: 4.5) for enzymatic reaction.

Once the flour was evenly dispersed in the water, the pH was adjusted to the desired pH of 7 using 4% NaOH. Once the slurry reached the desired temperature for hydrolysis, 8.82 g Alcalase FG was added. After 60 minutes of hydrolysis, the slurry pH was decreased to 4.03 via addition of 15% HCl solution. The slurry temperature was heated to 85-90° C. and held for 10 minutes to inactivate the Alcalase FG. The pH of the slurry was adjusted to 4.35.

A filtrate was obtained and spray dried at an inlet temperature adjusted to 225° C. and outlet temperature which was adjusted to 100° C. to obtain a first soluble rice flour composition.

In some instances, prior to spray-drying, the soluble rice flour liquefact was filtered using Buchner vacuum filtration (Whatman filter paper grade 4 or VWR filter paper 417 pore 35-45 μm) to obtain a second soluble rice flour composition that was filtered relative to the first soluble rice flour composition. Such filtration was followed by spray-draying. FIG. 1 provides a flow diagram of the process to make the first and second soluble rice flour compositions.

Table 1 provides the chemical properties of the starting material and first and second soluble rice flour compositions compared against a native white rice flour control (Honeyville® Fine White Rice Flour 338-0101, available from Honeyville, Ogden Utah). Tables 5 and 6 provide professional sensory evaluation of the various products. Notably, overall sensory was also similar to the control for both first and second soluble rice flour compositions.

TABLE 1

| Sample Label | Carbohydrate | Protein | Fat | Soluble Fiber | Insoluble fiber | Sugar | Galactose | Fructose |
|---|---|---|---|---|---|---|---|---|
| Honeyville flour | 81.50% | 7.24% | 1.40% | 2.00% | 0.60% | 0.54% | <0.1% | <0.1% |
| Soluble rice flour starting material | 85.90% | 6.92% | 0.80% | 0.80% | 1.00% | 3.09% | <0.1% | <0.1% |
| First Soluble Rice Flour Composition (unfiltered) | 87.10% | 6.97% | 0.70% | 1.70% | 0.90% | 3.11% | <0.1% | <0.1% |
| Second Soluble Rice Flour Composition (filtered) | 88.80% | 5.16% | <0.5% | 1.00% | 0.30% | 3.21% | <0.1% | <0.1% |

| | Sample Label | Glucose | Sucrose | Maltose | Lactose | Ash | Moisture | DE* |
|---|---|---|---|---|---|---|---|---|
| | Honeyville flour | 0.21% | <0.1% | 0.33% | <0.1% | 0.55% | 9.34% | |
| | Soluble rice flour starting material | 1.46% | <0.1% | 1.63% | <0.1% | 1.24% | 5.14% | 12.4 |
| | First Soluble Rice Flour Composition (unfiltered) | 1.55% | <0.1% | 1.56% | <0.1% | 1.78% | 3.42% | 12.25 |
| | Second Soluble Rice Flour Composition (filtered) | 1.60% | <0.1% | 1.61% | <0.1% | 1.88% | 4.23% | 12.81 |

*DE (Dextrose Equivalent) was determined by Schoorl's analysis

Example 2: Solubility and Particle Size Distribution

The soluble rice flour compositions described herein are desirable for use in food products, particularly beverage applications because they demonstrated good solubility functionality. Particle size distribution analysis was carried out using a Malvern Mastersizer 3000 Laser Light Diffraction Particle Size Analyzer. The particle size of material was determined by laser diffraction, which measured particle size distributions determined by angular variation in intensity of light scattered as a laser beam passes through a dispersed particulate sample. This dispersed particulate sample was a slurry in water. Dx (10), (50) and (90) means 10%, 50% and 90% of the population lied below the diameters of D10, D50 and D90 respectively. D[4,3] is volume weighted mean. In sample preparation, 10 ml of 1% solution of maltodextrin or soluble flour was prepared. Sample was added to the Hydro LV cell dropwise until the obscuration reached at least 1% to start measurement. If the 1% 10 ml solution was added and the obscuration was still less than 1%, the particle sizes were considered to be zero.

Figure 2:
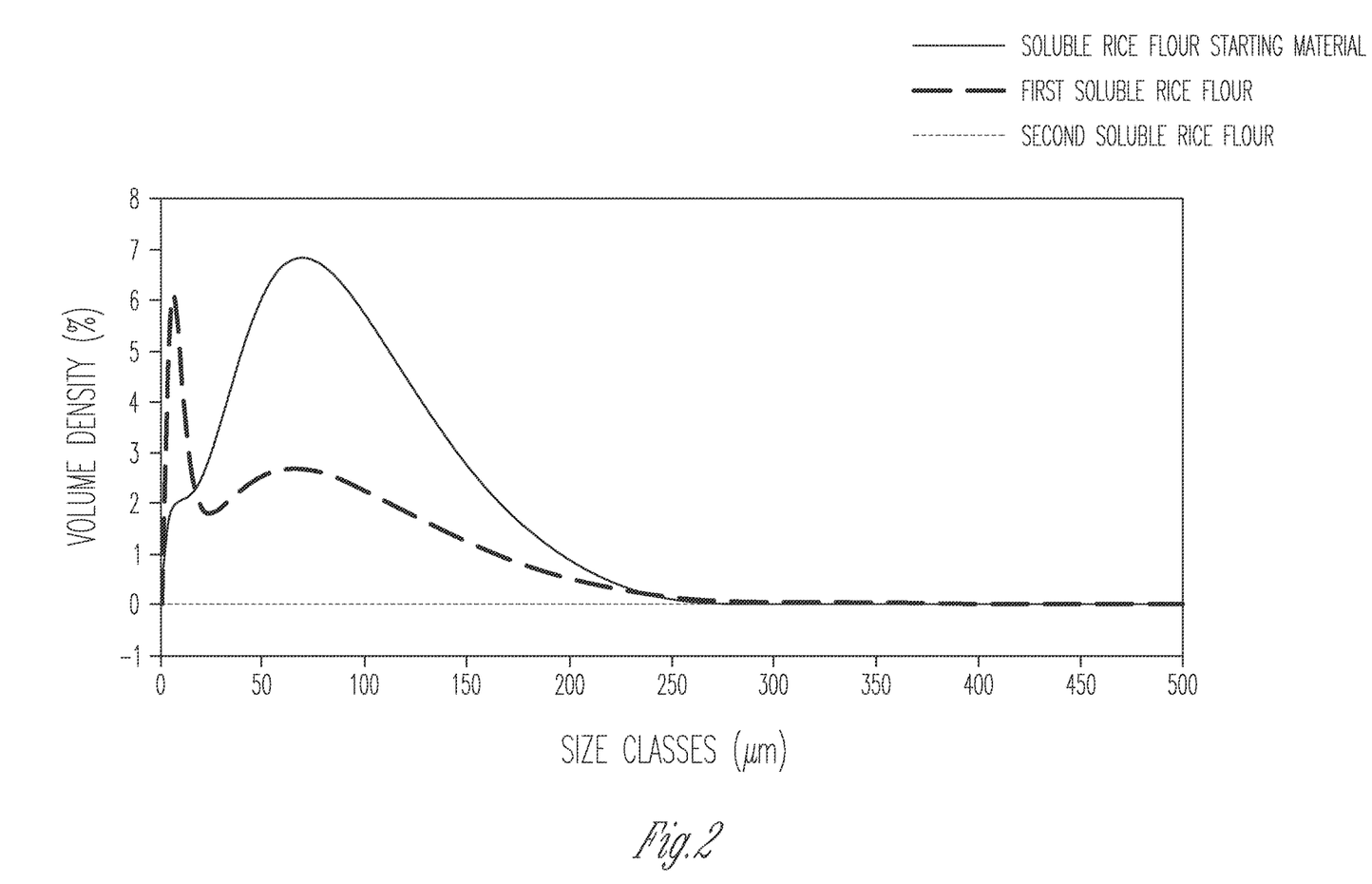
FIG. 2 shows the particle size distribution of the soluble rice flour compositions described herein.

Table 2 and FIG. 2 shows the particle size distribution of the starting soluble rice flour material and the first and second soluble rice flour compositions described herein. Notably, both first and second soluble rice flour compositions demonstrated good solubility indicative of the particle size distribution, however the filtering of the second soluble rice flour composition enhanced such solubility having nearly complete solubility indicative of a general particle size distribution of 0 microns.

TABLE 2

| Sample Name | Dx (10) (μm) | Dx (50) (μm) | Dx (90) (μm) | D [4,3] (μm) | Mode (μm) |
|---|---|---|---|---|---|
| Soluble Rice flour starting material | 4.06 | 43.6 | 117 | 52.8 | 69.5 |
| First Soluble Rice Flour Composition (unfiltered) | 2.49 | 8.65 | 82.9 | 27.4 | 6.34 |
| Second Soluble Rice Flour Composition (filtered) | 0 | | 0 | 0 | 0 |

Example #3: Viscosity

Figure 3:
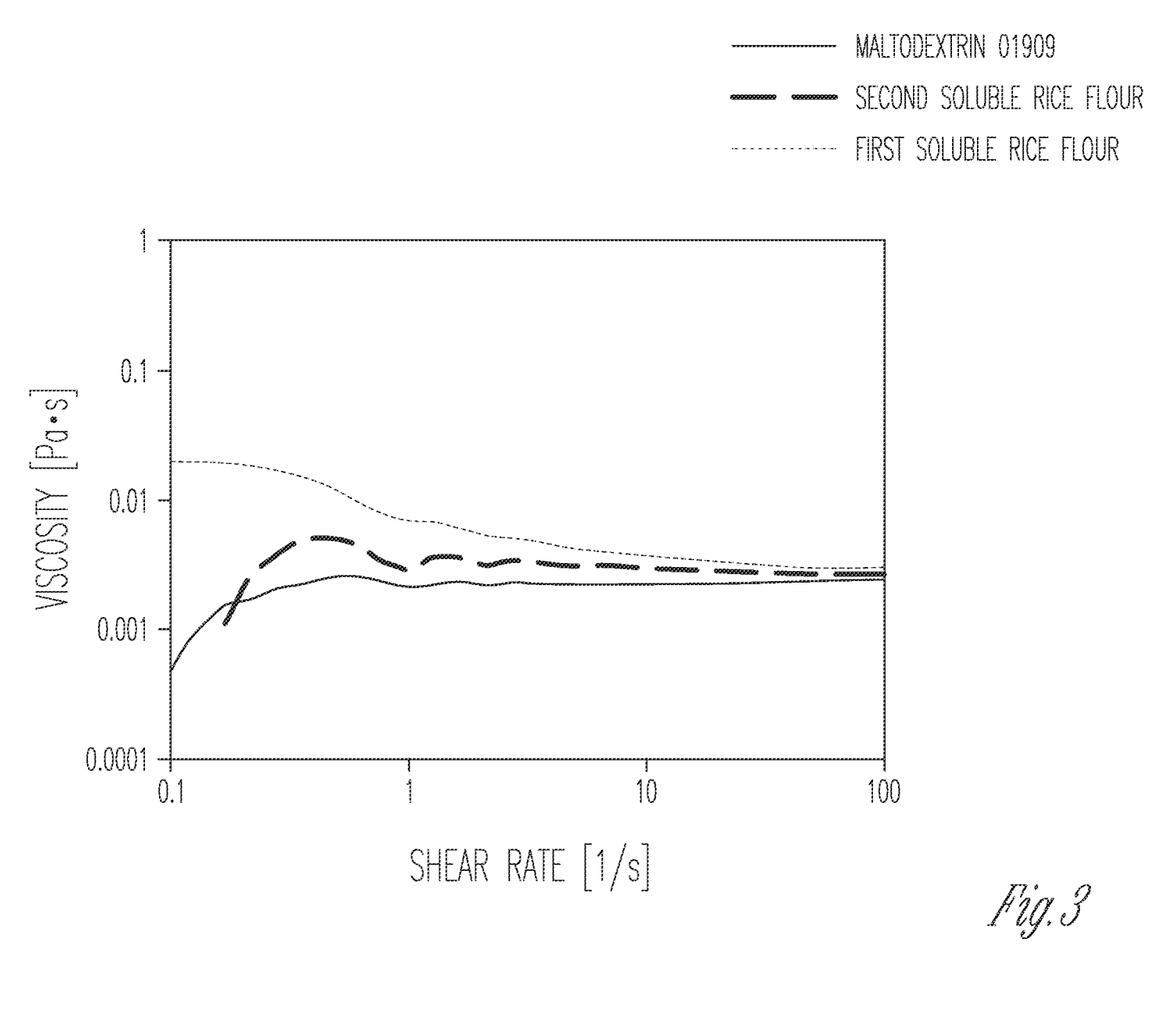
FIGS. 3 and 4 provide viscosity curves of the soluble rice flour compositions at a given temperature and shear rate, respectively, compared to maltodextrin.
Figure 4:
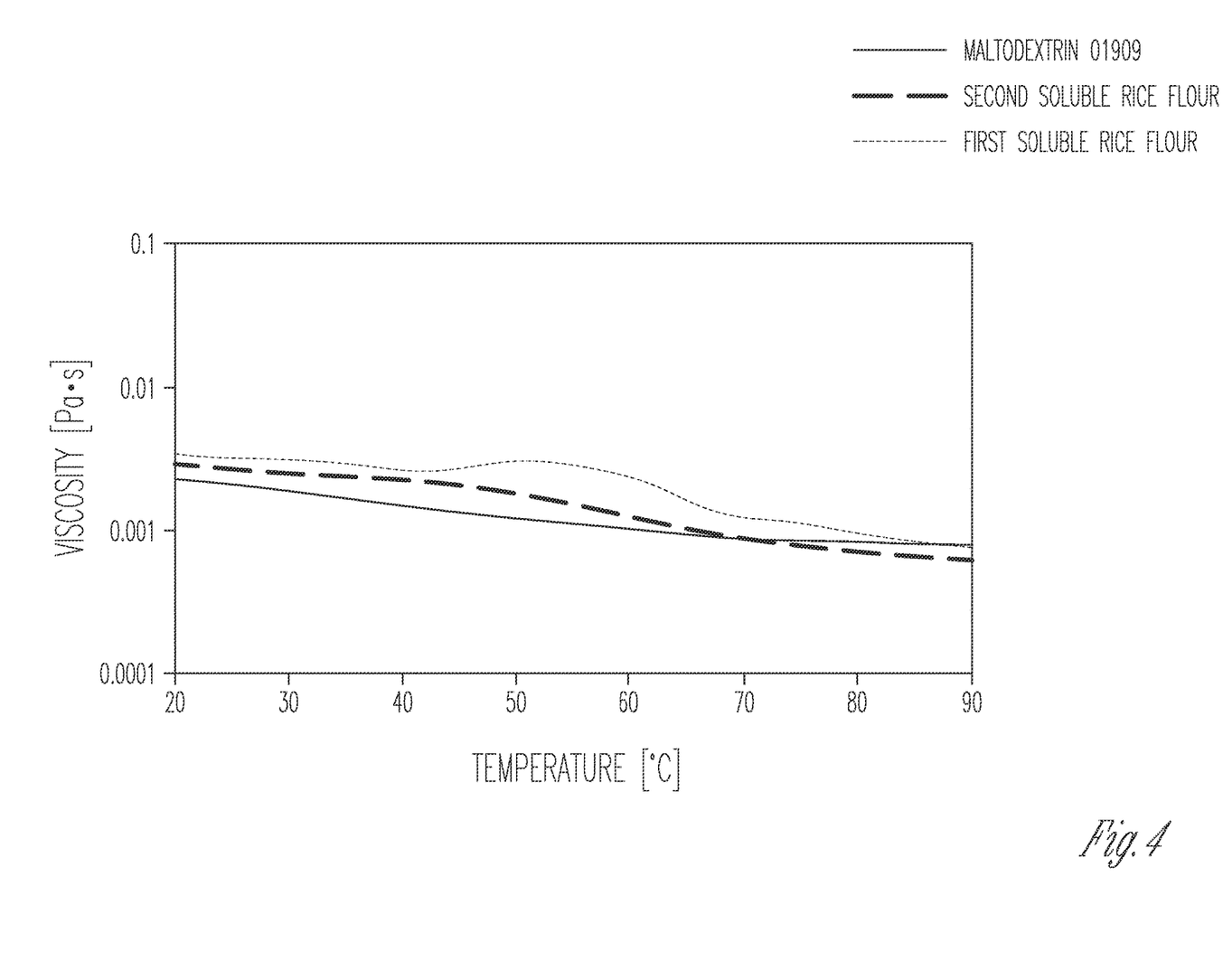

The soluble rice flour compositions described herein are desirable for use in food products because they demonstrate good viscosity functionality as well. FIGS. 3 and 4 provide viscosity curves at a given shear rate and temperature, respectively, compared to maltodextrin. FIG. 3 provides viscosity profiles of the various samples when measured at 20° C. at shear rates between 0.1-100/s and 10% solids. At a shear rate of 1 [l/s], the first soluble flour composition had a viscosity of 6.8 centipoise (cP) and the second soluble flour composition had a viscosity of 2.9 cP compared to a maltodextrin viscosity of 2.2 cP. FIG. 4 provides that at 25° C., the first soluble flour composition had a viscosity of 3.3 cP and the second soluble flour composition had a viscosity of 2.7 cP, compared to maltodextrin having a viscosity of 2.1 cP, when measured at a shear rate of 20/s.

Example #4: Beverage Application for Viscosity, Turbidity, and Sensor Analysis

Listed amounts in Table 3 of citric acid, malic acid, ViaTech™ TS 300+, granulated sugar, potassium citrate, and natural peach flavor were added to a resealable bag. The bag was shaken for up to two minutes. 4.694 grams of the blend was added to 5.736 grams of maltodextrin, or first or second soluble rice flour compositions in a 100 mL tri-pour. The mixture was mixed well by gently stirring with a spoon. Water was weighed in an appropriate container and peach base was added to the water (453.6 g) The mixture was stirred well to allow the sample to sit for 2 minutes, and be evaluated.

TABLE 3

| Ingredients | % (wt/wt) | wt (g) |
|---|---|---|
| Maltodextrin 10 DE (01909) | 50.547% | 5.27200 |
| Citric Acid, Anhydrous, Fine | 10.690% | 1.11500 |
| Malic Acid | 0.820% | 0.08600 |
| ViaTech ™ TS 300+ | 1.439% | 0.15000 |
| Granulated Sugar | 29.690% | 3.09700 |
| Potassium citrate | 0.914% | 0.09500 |
| Natural Flavor Peach | 1.450% | 0.1510 |
| Sodium Benzoate (for room temp shelf-life study) | 4.450% | 0.4640 |
| RO Water | 0.000% | 453.6000 |
| | 100.00% | 464.03 |

Table 4 shows viscosity data for the various beverage formulations on Day 1 directly after mixing. Viscosity was acquired using a Brookfield DV-11+ Pro (LV) Viscometer using spindle #1 at 60 rpm.

TABLE 4

| Sample | RPM | cP |
|---|---|---|
| Control (maltodextrin) | 60.00 | 2.80 |
| Soluble rice flour (Starting Material) | 60.00 | 2.80 |
| First Soluble Rice Flour Composition (not filtered) | 60.00 | 3.10 |
| Second Soluble Rice Flour Composition (filtered) | 60.00 | 2.60 |

Figure 5:
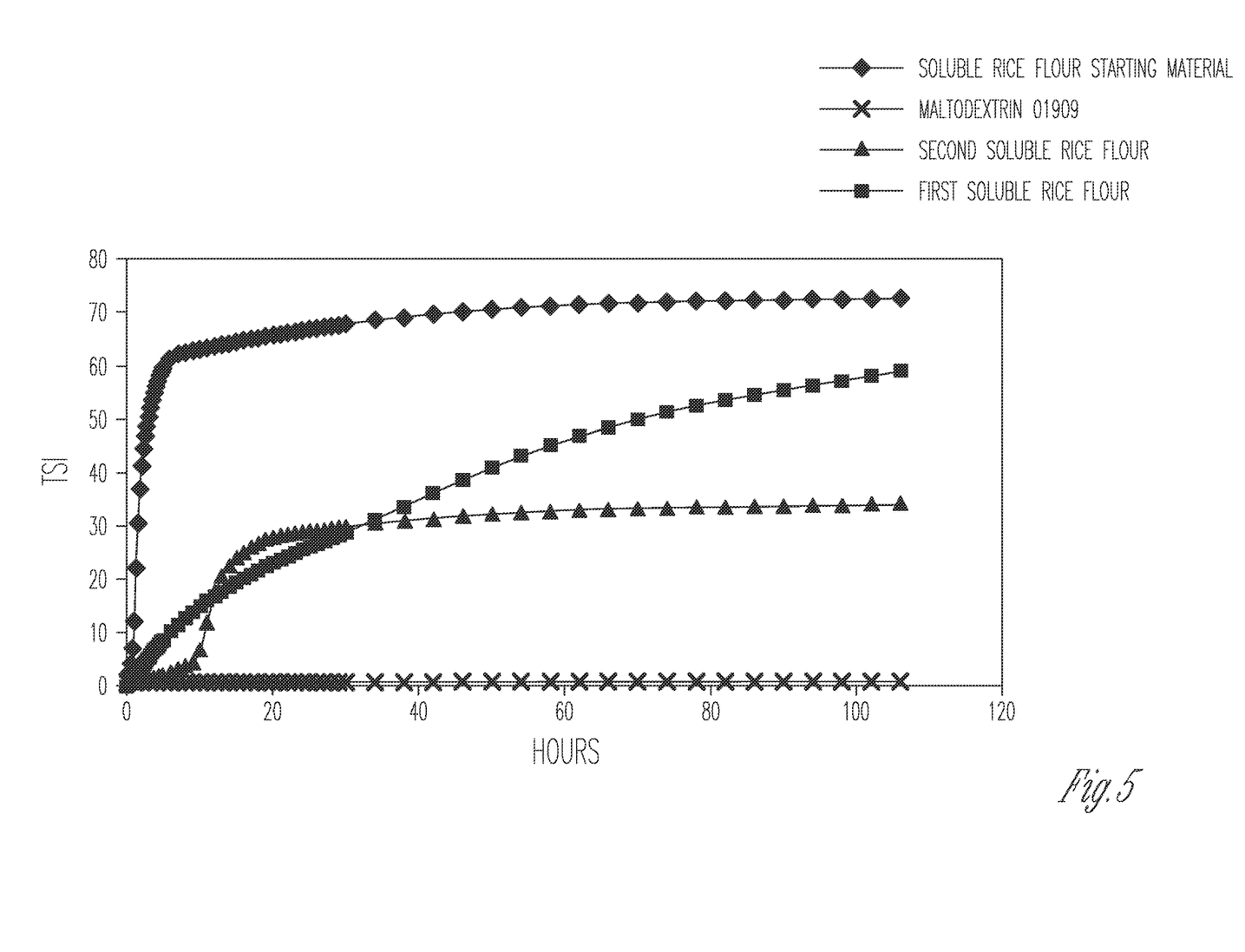
FIG. 5 provides the Turbiscan Stability Index of beverages containing the soluble rice flour compositions compared to maltodextrin.

FIG. 5 provides the Turbiscan Stability index (TSI) of beverages containing maltodextrin (control), soluble rice flour starting material (Sample 1), first soluble rice flour composition (Sample 2), and second soluble rice flour composition (Sample 3). Notably, the first and second rice flour compositions showed improved stability in water compared to the soluble rice flour starting material, having a EST of less than 10 over a period of 10 hours.

Four individuals participated in a sensory panel of the beverage samples. Each panelist was served about 2 oz of sample in 2 oz serving cups. Panelists were instructed to cleanse their palate with water in between samples. Comparison questionnaires aimed at comparing characteristics and attributes of the test samples compared to beverages containing control 10 DE maltodextrin were completed. Mean comparison score were calculated, and are presented in Table 5

The starting material exhibited cloudy appearance, chalky mouthfeel, and particulates were observed to rapidly settle to the bottom of the container. The first soluble rice flour composition appeared cloudy but with only small amount of particulate rapidly settling, and had a slightly chalky/powdery mouthfeel, but much less than the starting material. The second soluble flour composition exhibited likeness over 4, and was hazy but not cloudy with no settling of particulates or chalky mouthfeel reported.

TABLE 5

| Characteristics & Attributes | Control (Maltodextrin) | Soluble rice flour starting material | First Soluble Rice Flour Composition (not filtered) | Second Soluble Rice Flour Composition (filtered) |
|---|---|---|---|---|
| Appearance & color | 5.0 | 1.8 | 3.0 | 4.3 |
| Overall aroma | 5.0 | 3.6 | 4.1 | 4.4 |
| Overall taste | 5.0 | 2.4 | 3.6 | 4.4 |
| Overall texture | 5.0 | 2.8 | 3.5 | 4.5 |
| Off-flavor | 5.0 | 2.8 | 3.5 | 4.3 |
| Overall flavor | 5.0 | 2.4 | 3.3 | 4.1 |
| Overall likeness | 5.0 | 2.5 | 3.3 | 4.3 |

Example #5

Five milk solutions were prepared. Each of the milk solutions could be used as an infant milk solution. In each of the five milk solutions, 5.20 g of a bulking agent chosen from the soluble rice flour starting material, the first soluble rice flour composition, the second soluble rice flour composition, maltodextrin Cargill Dry MD 01909 (10 DE), maltodextrin C*Dry MD 01915 (18 DE), respectively were mixed with 20.8 g of a commercial fat-filled milk powder (Nespray Everyday Instant Milk Powder, Nestle) The constituents were mixed in 180 mL of water, which was heated to 50° C. In each of the five milk solutions, the ratio between the respective soluble rice flour starting material, first soluble rice flour composition, second soluble rice flour composition, maltodextrin 01909, and maltodextrin 01915 to the fat-filled milk powder was 20:80.

The taste of the respective milk solutions was evaluated by 5 internal panelists, who were presented with 5 coded samples and were asked to provide sensory comments. The results shown in Table 6 demonstrate that a milk solution including the second soluble rice flour composition compares well to a milk solution including maltodextrin 01909 and maltodextrin 01915, thus constituting an adequate substitute for a maltodextrin.

TABLE 6

| Bulking Agent | Soluble rice flour starting material | First soluble rice flour composition | Second soluble rice flour composition | Cargill Dry MD 01909 | C*Dry 01915 |
|---|---|---|---|---|---|
| Sensed Attribute | Most chalky mouthfeel with starchy aroma. | Slightly chalky mouthfeel with a savory finish. | No chalky mouthfeel. Savory finish. | No chalky mouthfeel. | No chalky mouthfeel. Sweetest tasting amongst all the sample. |

EXEMPLARY ASPECTS

The following exemplary aspects are provided, the numbering of which is not to be construed as designating levels of importance:

Aspect 1 provides a soluble rice flour composition, comprising
a carbohydrate content ranging from 80 to 95 wt %,
a protein content ranging from 2 to 10 wt %,
a fat content of less than 3 wt %, and
an insoluble fiber content less than 3 wt %.

Aspect 2 provides the composition of Aspect 1, wherein the carbohydrate content ranges from 85 to 90 wt %.

Aspect 3 provides the composition of any one of Aspects 1 or 2, wherein the protein content ranges from 4 to 8 wt %.

Aspect 4 provides the composition of any one of Aspects 1-3, having a dextrose equivalent ranging from 5 to 18.

Aspect 5 provides the composition of Aspect 4, having a dextrose equivalent ranging from 8 to 15.

Aspect 6 provides the composition of any one of Aspects 1-5, wherein the soluble rice flour composition is filtered.

Aspect 7 provides the composition of any one of Aspects 1-6, having a viscosity ranging from 1 to 10 cP at 20° C. and 10% dry solids.

Aspect 8 provides the composition of any one of Aspects 1-7, having a viscosity ranging from 2.5 to 3.5 cP at 20° C. and 10% dry solids.

Aspect 9 provides a soluble rice flour composition, wherein 90% of particles of the composition have a size of 100 microns or less and 50% of particles have a particle size of 25 microns or less.

Aspect 10 provides the soluble rice flour composition of Aspect 9, wherein 10% of the particles of the composition have a size of 10 microns or less.

Aspect 11 provides a soluble rice flour composition, wherein 100% of particles of the composition have a size of less than 1 micron.

Aspect 12 provides the composition of Aspect 11, wherein 100% of the particles of the composition have a size of less than 0.5 microns.

Aspect 13 provides the composition of any one of Aspects 11 or 12, wherein the composition is substantially soluble in water.

Aspect 14 provides the composition of any one of Aspects 9-13, comprising a Turbiscan Stability Index (TSI) of less than 10 over a period of 10 hours.

Aspect 15 provides a food product, comprising the soluble rice flour composition of any one of Aspects 1-14.

Aspect 16 provides the food product of Aspect 15 wherein the food product is a beverage mix, infant food, an infant, beverage, a medicinal product, an emulsion, a convenience food, or a snack-based filling.

Aspect 17 provides the food product of any one of Aspects 15 or 16 wherein the soluble rice flour composition is at least a partial replacement of maltodextrin.

Aspect 18 provides the food product of any one of Aspects 15-17, wherein the soluble rice flour composition is a full replacement of maltodextrin.

Aspect 19 provides use of a soluble rice flour composition in any one of Aspects 1-18, in a beverage mix, an infant food, a medicinal product, an emulsion, a convenience food, or a snack-based filling, or a food product.

Aspect 20 provides a method of preparing the rice flour composition of any one of Aspects 1-19, the method comprising:
treating a rice flour with a first enzyme to form a treated rice flour;
treating the treated rice flour with a second enzyme that is different than the first enzyme to form the soluble rice flour composition.

Aspect 21 provides the method of Aspect 20, wherein the first enzyme comprises an alpha-amylase enzyme.

Aspect 22 provides the method of any one of Aspects 20 or 21, wherein the second enzyme comprises a protease enzyme.

Aspect 23 provides the method of any one of Aspects 20-22, farther comprising filtering the soluble rice flour composition.

The invention claimed is:
1. A soluble rice flour composition, comprising:
a carbohydrate content ranging from 80 to 95 wt %,
a protein content ranging from 2 to 10 wt %,
a fat content of less than 3 wt %, and
an insoluble fiber content 0.3 to 3 wt %;
wherein:
the soluble rice flour composition has a particle size distribution after solubilization in 90° C. water wherein 90% of particles have a size of 100 microns or less, 50% of particles have a particle size 25 microns or less based on wet/dispersed solubility in 90° C. water;
the soluble rice flour composition has a dextrose equivalent ranging from 5 to 18; and
the soluble rice flour composition is a protease-enzyme treated soluble rice flour.

2. The soluble rice flour composition of claim 1, wherein the carbohydrate content ranges from 85 to 90 wt %.

3. The soluble rice flour composition of claim 1, wherein the protein content ranges from 4 to 8 wt %.

4. The soluble rice flour composition of claim 1, having a dextrose equivalent ranging from 8 to 15.

5. The soluble rice flour composition of claim 1, wherein the soluble rice flour composition is filtered.

6. The soluble rice flour composition of claim 1, having a viscosity ranging from 1 to 10 cP at 20° C. and 10% dry solids.

7. The soluble rice flour composition of claim 1, having a viscosity ranging from 2.5 to 3.5 cP at 20° C. and 10% dry solids.

8. A food product, comprising the soluble rice flour composition of claim 1.

9. The food product of claim 8, wherein the food product is a beverage mix, infant food, an infant beverage, a medicinal product, an emulsion, a convenience food, or a snack-based filling.

10. The food product of claim 8, wherein the soluble rice flour composition is at least a partial replacement of maltodextrin.

11. The food product of claim 8, wherein the soluble rice flour composition is a full replacement of maltodextrin.

12. A method of preparing the soluble rice flour composition of claim 1, the method comprising:
    treating a rice flour with a first enzyme to form a treated rice flour;
    treating the treated rice flour with a second enzyme that is different than the first enzyme to form the soluble rice flour composition;
    wherein the second enzyme is a protease enzyme.

13. The method of claim 12, wherein the first enzyme comprises an alpha-amylase enzyme.

14. The method of claim 12, further comprising filtering the soluble rice flour composition.

15. The soluble rice flour composition of claim 1, wherein the soluble rice flour composition has a particle size distribution after solubilization in 90° C. water wherein 90% of the particles have a particle size of 100 microns to at least 10 microns based on wet/dispersed solubility in 90° C. water.

16. The soluble rice flour composition of claim 5, wherein the filtered, soluble rice flour composition has a particle size distribution after solubilization in 90° C. water wherein 100% of particles have a size of less than 1 micron.

* * * * *